United States Patent
Chai et al.

(10) Patent No.: US 10,551,968 B2
(45) Date of Patent: Feb. 4, 2020

(54) ARRAY SUBSTRATE AND TOUCH DISPLAY PANEL FOR INCREASED ACCURACY OF TOUCH DETECTION BY INCLUDING A COMMON ELECTRODE LAYER AND A WIRING LAYER ARRANGED ON THE SAME SIDE OF THE ARRAY SUBSTRATE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Huiping Chai, Shanghai (CN); Qijun Yao, Shanghai (CN); Gujun Li, Shanghai (CN)

(*) Notice: Subject to any disclaimer, the term of this patent is extended or adjusted under 35 U.S.C. 154(b) by 286 days.

(21) Appl. No.: 15/162,645

(22) Filed: May 24, 2016

(65) Prior Publication Data

US 2017/0192607 A1 Jul. 6, 2017

(30) Foreign Application Priority Data

Dec. 31, 2015 (CN) .......................... 2015 1 1031443

(51) Int. Cl.
*G06F 3/041* (2006.01)
*G02F 1/1333* (2006.01)
(Continued)

(52) U.S. Cl.
CPC .......... *G06F 3/0418* (2013.01); *G02F 1/1368* (2013.01); *G02F 1/13338* (2013.01);
(Continued)

(58) Field of Classification Search
None
See application file for complete search history.

(56) References Cited

U.S. PATENT DOCUMENTS

2013/0147724 A1* 6/2013 Hwang ................. G06F 3/0412
345/173
2013/0235020 A1* 9/2013 Kim ..................... G09G 3/3648
345/212

(Continued)

FOREIGN PATENT DOCUMENTS

CN 103164058 A 6/2013
CN 104035615 A 9/2014
(Continued)

*Primary Examiner* — Amr A Awad
*Assistant Examiner* — Donna V Lui
(74) *Attorney, Agent, or Firm* — Kilpatrick Townsend & Stockton, LLP (57) ABSTRACT

An array substrate and a touch display panel are provided. An auxiliary electrode layer is additionally provided in the array substrate. The auxiliary electrode layer may be located between a common electrode layer and a wiring layer, or located on a side of the wiring layer facing toward the substrate. The auxiliary electrode layer is provided to reduce coupling capacitance between the wiring and the touch display electrode. With the auxiliary electrode layer additionally provided in the array substrate, the coupling capacitance between the wiring and the touch display electrode block is reduced, thereby improving accuracy of the touch detection.

9 Claims, 8 Drawing Sheets

(51) Int. Cl.
    *G02F 1/1335*    (2006.01)
    *G02F 1/1343*    (2006.01)
    *G02F 1/1362*    (2006.01)
    *G02F 1/1368*    (2006.01)
    *G06F 3/044*     (2006.01)

(52) U.S. Cl.
    CPC .... *G02F 1/13439* (2013.01); *G02F 1/133345*
            (2013.01); *G02F 1/133514* (2013.01); *G02F
            1/134309* (2013.01); *G02F 1/136286*
            (2013.01); *G06F 3/044* (2013.01); *G06F
            3/0412* (2013.01); *G02F 2201/121* (2013.01);
            *G02F 2201/123* (2013.01); *G06F 2203/04111*
                                                (2013.01)

(56)            References Cited

U.S. PATENT DOCUMENTS

2014/0083834 A1    3/2014  Chou et al.
2016/0048267 A1*   2/2016  Lee ..................... G06F 3/0418
                                                      345/173
2016/0216817 A1*   7/2016  Yang .................... G06F 3/0412
2016/0253023 A1*   9/2016  Aoyama ............... G06F 3/0416
                                                      345/174
2016/0283000 A1    9/2016  Wang et al.
2016/0291775 A1   10/2016  Li et al.
2017/0108976 A1*   4/2017  Ding ...................... G06F 3/044
2017/0153731 A1    6/2017  Liu et al.
2018/0067592 A1*   3/2018  Kimura .................. G06F 3/047

FOREIGN PATENT DOCUMENTS

CN       104698702 A    6/2015
CN       104699316 A    6/2015
CN       104793803 A    7/2015
CN       104849895 A    8/2015
CN       105487719 A    4/2016
KR     20130099525 A    9/2013

* cited by examiner

ARRAY SUBSTRATE AND TOUCH DISPLAY PANEL FOR INCREASED ACCURACY OF TOUCH DETECTION BY INCLUDING A COMMON ELECTRODE LAYER AND A WIRING LAYER ARRANGED ON THE SAME SIDE OF THE ARRAY SUBSTRATE

CROSS REFERENCE OF RELATED APPLICATION

This application claims the priority to Chinese Patent Application No. 201511031443.8, entitled "ARRAY SUBSTRATE AND TOUCH DISPLAY PANEL", filed with the Chinese State Intellectual Property Office on Dec. 31, 2015, which is incorporated by reference in its entirety herein.

FIELD

The disclosure relates to the field of touch display technology, and in particular to an array substrate and a touch display panel.

BACKGROUND

With development of the science and technology, a touch display device is more and more widely adopted in and brings great convenience to daily life and work of people, and thus has become an important and necessary tool. A main component of the touch display device is a touch display panel.

Figure 1:
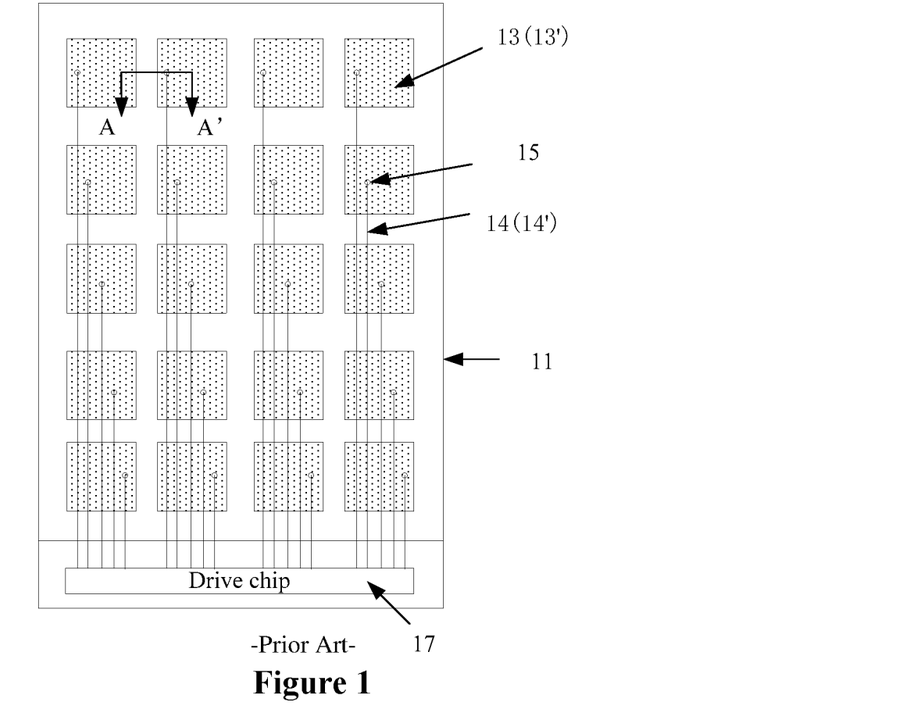
FIG. 1 is a plan view of a common touch display panel in the conventional technology.
Figure 2:
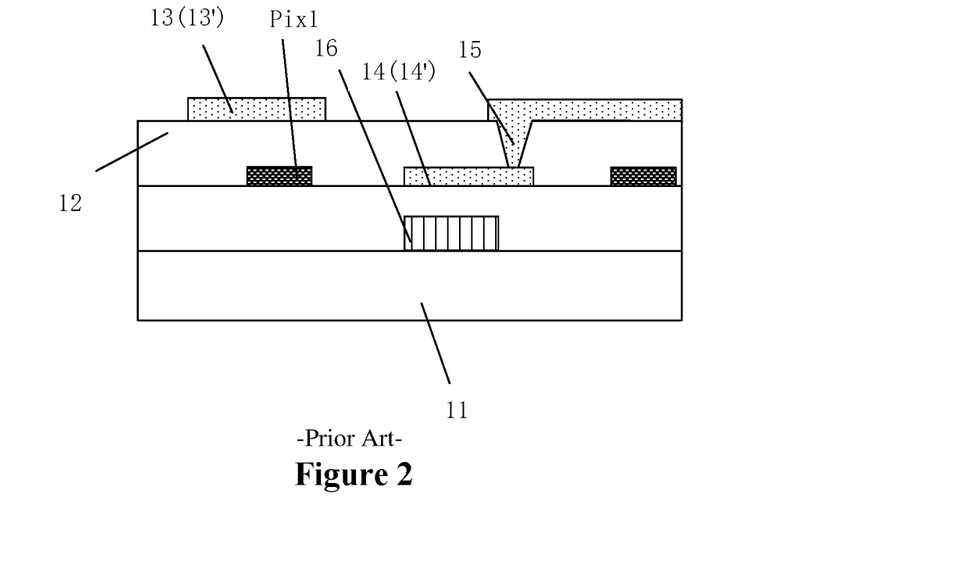
FIG. 2 is a sectional view of the touch display panel as shown in FIG. 1 in the AA' direction.

Referring to FIGS. 1 and 2, FIG. 1 is a plan view of a common touch display panel in the conventional technology, and FIG. 2 is a sectional view of the touch display panel as shown in FIG. 1 in the AA' direction. The touch display panel includes a substrate 11, and a common electrode layer 13' and a wiring layer 14' arranged on a surface of the substrate 11. Specifically, the common electrode layer 13' and the wiring layer 14' are located in different conductive layers, and an insulating layer 12 is provided between the common electrode layer 13' and the wiring layer 14'. The common electrode layer 13' includes multiple electrode blocks 13 arranged in an array. The wiring layer 14' includes multiple wirings 14 connected to the multiple electrode blocks 13 in a one-to-one correspondence. Each of the electrode blocks 13 is connected to a respective one of the wirings 14 through a via hole 15. By driving the electrode blocks 13 in a time-division manner, the electrode block 13 is provided with a common voltage signal via the wiring 14 during a display timing period for display driving, and is provided with a touch signal via the wiring 14 during a touch timing period for touch driving.

The inventor has found by research that, in the conventional touch display panel, coupling capacitance may be formed between the wiring 14 and the electrode block 13 which is not connected to the wiring 14 in an extending direction of the wiring 14, thus accuracy of the touch detection may be affected, and it is especially the case with the application of the panel in a medium or large size.

SUMMARY

To solve the above problems, an array substrate and a touch display panel are provided in the present disclosure, for improving accuracy of touch detection.

To achieve the above objects, following technical solutions are provided in the present disclosure.

An array substrate is provided, which includes:

a substrate;

a common electrode layer and a wiring layer arranged on a same side of the substrate, where the common electrode layer and the wiring layer are arranged opposite to each other, the common electrode layer includes multiple touch display electrode blocks arranged in an array, the wiring layer includes multiple wirings electrically connected to the multiple touch display electrode blocks in a one-to-one correspondence; and an auxiliary electrode layer including multiple auxiliary electrode blocks, where a projection of an opening between the auxiliary electrode block and the touch display electrode block in a direction perpendicular to the substrate does not overlap a projection of the auxiliary electrode block in the direction perpendicular to the substrate, where the auxiliary electrode layer is located between the common electrode layer and the wiring layer, the auxiliary electrode layer is insulated from the common electrode layer and the wiring layer, and the auxiliary electrode layer is provided with a touch driving signal during a touch timing period and is provided with a common voltage signal during a display timing period.

Another array substrate is further provided in the present disclosure, which includes:

a substrate;

a common electrode layer and a wiring layer arranged on a same side of the substrate, where the common electrode layer and the wiring layer are arranged opposite to each other, the common electrode layer includes multiple touch display electrode blocks arranged in an array, the wiring layer includes multiple wirings electrically connected to the multiple touch display electrode blocks in a one-to-one correspondence; and an auxiliary electrode layer located between the wiring layer and the substrate, where the auxiliary electrode layer is located on a side of the wiring layer facing away from the common electrode layer, and the auxiliary electrode layer is insulated from the common electrode layer and the wiring layer, where the auxiliary electrode layer is provided with a touch driving signal during a touch timing period and is provided with a common voltage signal during a display timing period.

A touch display panel is further provided in the present disclosure, which includes:

an array substrate and a color film substrate arranged opposite to each other, where the array substrate is the one according to any one of the above descriptions; and a liquid crystal layer arranged between the array substrate and the color film substrate.

It can be seen from the above description that, the auxiliary electrode layer is additionally provided in the array substrate in the present disclosure. The auxiliary electrode layer may be located between the common electrode layer and the wiring layer, or located on a side of the wiring layer facing toward the substrate. The auxiliary electrode layer is provided to reduce coupling capacitance between the wiring and the touch display electrode block. With the auxiliary electrode layer additionally provided in the array substrate, the coupling capacitance between the wiring and the touch display electrode block is reduced, thereby increasing strength of the touch signal, and improving accuracy of the touch detection.

BRIEF DESCRIPTION OF THE DRAWINGS

The drawings to be used in the description of the embodiments or the conventional technology are described briefly as follows, so that the technical solutions according to the embodiments of the present disclosure or in the conventional technology become clearer. It is apparent that the drawings in the following description only illustrate embodiments of the present disclosure. Other drawings may be obtained by those skilled in the art according to these drawings without any creative labor.

DETAILED DESCRIPTION OF EMBODIMENTS

The technical solutions according to the embodiments of the present disclosure are described clearly and completely in conjunction with the drawings hereinafter. Apparently, the described embodiments are only a few rather than all of the embodiments according to the present disclosure. Any other embodiments obtained by those skilled in the art based on the embodiments in the present disclosure without any creative labor fall into the scope of protection of the present disclosure.

As shown in FIG. 1 and FIG. 2, in a conventional touch display panel, for any one wiring 14, coupling capacitance may be formed between the wiring 14 and an electrode block 13 which is insulated from the wiring 14 and is located opposite to the wiring 14 in an extending direction of the wiring 14, and coupling capacitance may also be formed between the wiring 14 and a data line 16 located opposite to the wiring 14. The existence of the coupling capacitance may interfere with a touch signal and affect accuracy of the touch detection. In the touch display panel as shown in FIG. 1, pixel electrodes Pix1 are located between a common electrode layer 13' and a substrate 11, and the wirings 14 are arranged in a same layer as the pixel electrodes Pix1. The wirings 14 are electrically connected to a drive chip 17.

Figure 3:
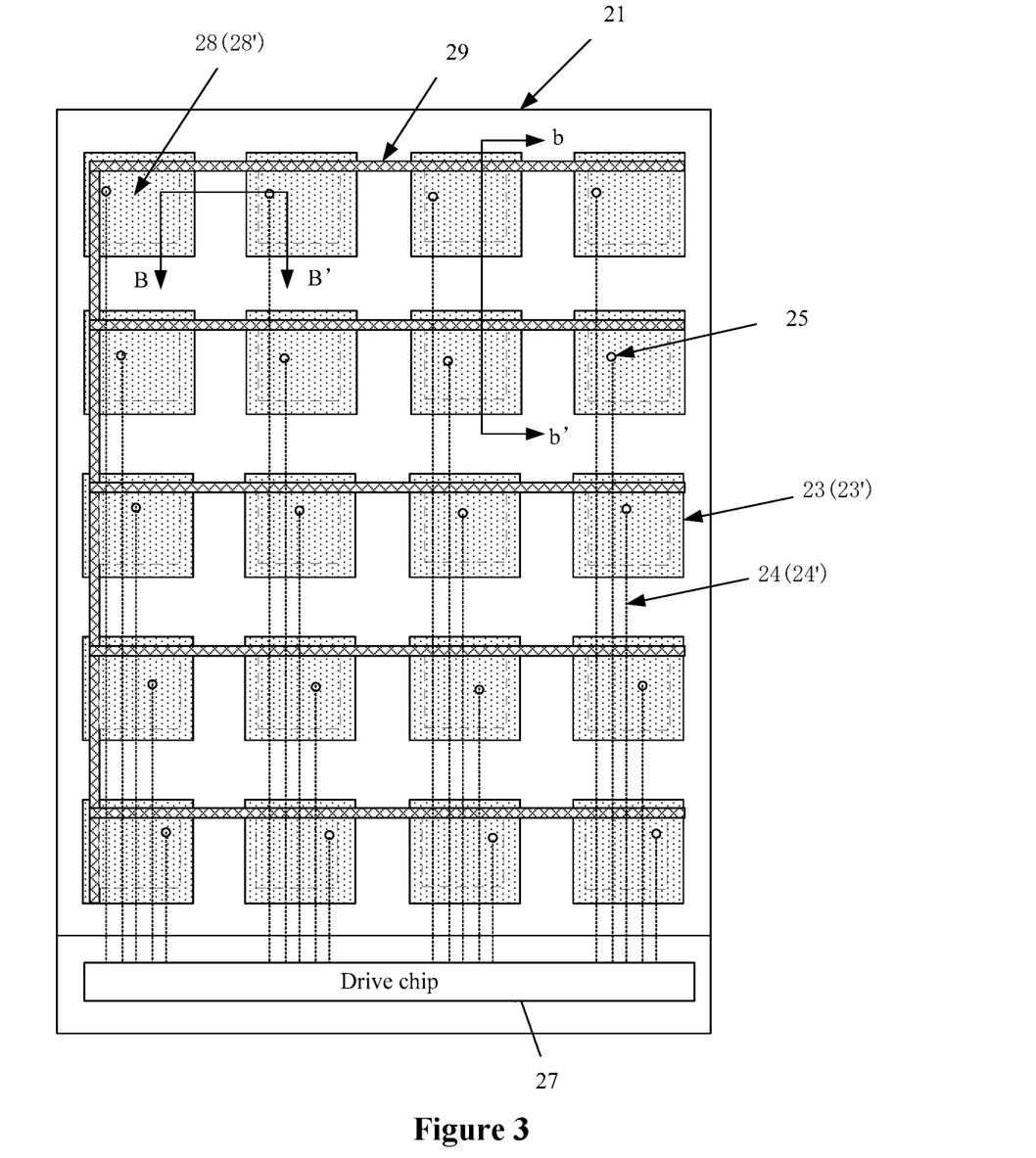
FIG. 3 is a plan view of an array substrate according to an embodiment of the present disclosure.
Figure 4A:
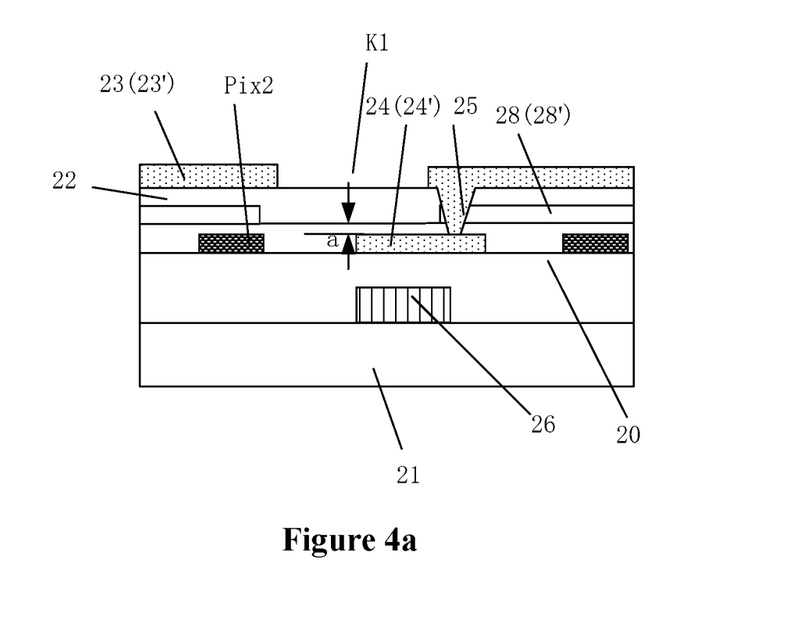
FIG. 4a is a sectional view of the array substrate as shown in FIG. 3 in the BB' direction.
Figure 4B:
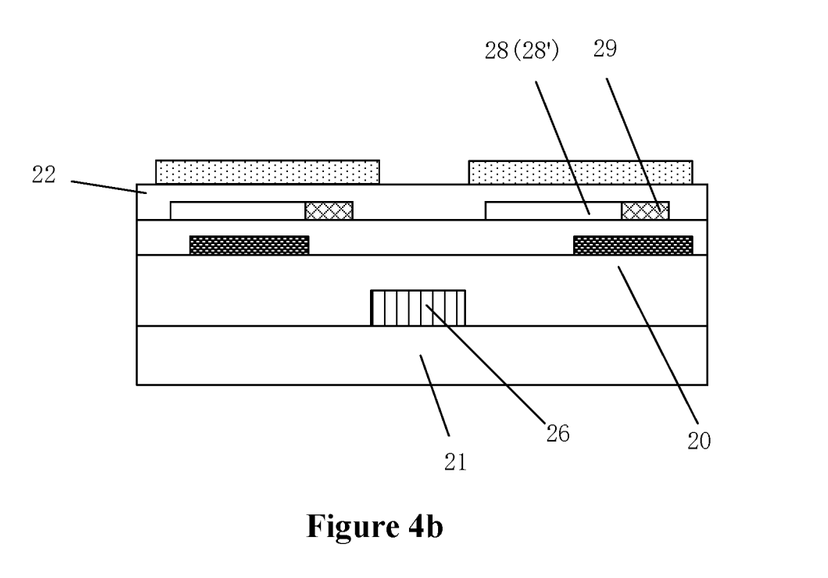
FIG. 4b is a sectional view of the array substrate as shown in FIG. 3 in the bb' direction.

To solve the above problems, an array substrate is provided in an embodiment of the present disclosure. The array substrate is as shown in FIG. 3, FIG. 4a and FIG. 4b. FIG. 3 is a plan view of an array substrate according to an embodiment of the present disclosure. FIG. 4a is a sectional view of the array substrate as shown in FIG. 3 in the BB' direction. FIG. 4b is a sectional view of the array substrate as shown in FIG. 3 in the bb' direction.

The array substrate according to an embodiment of the present disclosure includes a substrate 21; a common electrode layer 23' and a wiring layer 24' arranged on a same side of the substrate 21; and an auxiliary electrode layer 28' including multiple auxiliary electrode blocks 28. The common electrode layer 23' and the wiring layer 24' are arranged opposite to each other. The common electrode layer 23' includes multiple touch display electrode blocks 23 arranged in an array. The wiring layer 24' includes multiple wirings 24 electrically connected to the multiple touch display electrode blocks 23 in a one-to-one correspondence. A projection of an opening K1 between the auxiliary electrode block 28 and the touch display electrode block 23 in a direction perpendicular to the substrate 21 does not overlap a projection of the auxiliary electrode block 28 in the direction perpendicular to the substrate 21.

Each of the wirings 14 is electrically connected to a drive chip 27. The common electrode layer 23' and the wiring layer 24' are arranged in different conductive layers. An insulating layer 22 is provided between the common electrode layer 23' and the wiring layer 24'. The touch display electrode block 23 is electrically connected to a respective wiring 24 through a via hole 25.

The auxiliary electrode layer is located between the common electrode layer and the wiring layer. The auxiliary electrode layer is insulated from the common electrode layer and the wiring layer. The auxiliary electrode layer is provided with a touch driving signal during a touch timing period and is provided with a common voltage signal during a display timing period.

With the auxiliary electrode layer, electric-field distribution between the common electrode layer and the wiring layer can be changed, thereby reducing coupling capacitance between the common electrode layer and the wiring layer, increasing strength of the touch signal, and thus improving touch accuracy.

As shown in FIG. 3, the auxiliary electrode blocks 28 are electrically connected to each other via connectors 29. As shown in FIGS. 4a and 4b, in the array substrate according to an embodiment of the present disclosure, the auxiliary electrode blocks 28 are arranged in a same conductive layer as the connectors 29. In this case, the auxiliary electrode blocks 28 is composed of a same metal layer as the connectors 29, and the auxiliary electrode blocks 28 and the connectors 29 are formed as a whole. A boundary line between the auxiliary electrode block 28 and the connector 29 as shown in FIG. 3 is merely for facilitating the distinction and explanation, but does not exist in a real product.

In an alternative embodiment, the connector may be arranged on a side of the substrate closer to the auxiliary electrode block, and the auxiliary electrode block is electrically connected to the connector through a via hole.

The array substrate further includes multiple pixel transistors arranged in an array and pixel electrodes Pix2 electrically connected to the multiple pixel transistors in a one-to-one correspondence. Each of the pixel transistors has a gate, a first electrode and a second electrode, with the second electrode being electrically connected to a respective one of the pixel electrodes Pix2. It should be noted that, no pixel transistor is shown in FIGS. 4a and 4b due to the perspective.

As shown in FIG. 3, a projection of the auxiliary electrode block 28 on the substrate is located within a projection of the touch display electrode block 23 on the substrate in the direction perpendicular to the substrate 21, and the auxiliary electrode blocks 28 and the touch display electrode blocks 23 have a one-to-one correspondence in the direction perpendicular to the substrate 21. The shapes of the auxiliary electrode block 28 and the touch display electrode block 23 are rectangles with a same length-width ratio, and centers of the auxiliary electrode block 28 and the touch display electrode block 23 are arranged directly facing toward each other in the direction perpendicular to the substrate 21. The auxiliary electrode block 28 may have a size which is the same as or less than that of the touch display electrode block 23.

To achieve normal image display, the auxiliary electrode blocks 28 and the connectors 29 each are transparent. Preferably, the auxiliary electrode blocks 28 and the connectors 29 may be composed of indium tin oxide (ITO).

In an alternative embodiment, a projection of the auxiliary electrode block on the substrate is located within a projection of the pixel electrode on the substrate in the direction perpendicular to the substrate, and the auxiliary electrode blocks and the pixel electrodes have a one-to-one correspondence in the direction perpendicular to the substrate. In this case, the auxiliary electrode blocks and the pixel electrodes are arranged opposite to each other, and the auxiliary electrode blocks are transparent, so that normal image display is achieved. The connectors may be transparent or non-transparent. The pixel electrodes may be located above or below the auxiliary electrode layer. Preferably, a shape of an auxiliary electrode within a sub-pixel is consistent with a shape of a touch electrode within the sub-pixel in a case that the pixel electrodes are located below the auxiliary electrode layer. In this case, an electric field between the pixel electrode and the touch electrode will not be shielded by an auxiliary electrode during a display stage.

In touch detection, to reduce interference of the wiring on the touch display electrode block effectively, as shown in FIG. 4a, a distance a between the wiring layer 24' and the auxiliary electrode blocks is set to be equal to or less than 10 μm. In this case, with the auxiliary electrode blocks, coupling capacitance between the wiring 24 and the touch display electrode block 23 is reduced effectively, thereby enhancing strength of the touch signal and improving accuracy of the touch detection.

The array substrate according to an embodiment of the present disclosure further includes a data line 26 arranged between the substrate 21 and the wiring layer 24', and an insulating layer 20 is provided between the data line 26 and the wiring layer 24'. The insulating layer 20 may be a layer composed of $SiN_x$, $SiO_2$ or the like, or may be a combination of an organic insulating layer and a common insulating layer. With the auxiliary electrode layer 28', electric-field distribution between the data line 26 and the wiring 24 can be changed, thereby reducing coupling capacitance between the data line 26 and the wiring 24, and thus improving accuracy of the touch detection.

In the embodiments as shown in FIGS. 3, 4a and 4b, the wiring layer is located between the common electrode layer and the substrate. The auxiliary electrode layer is located between the wiring layer and the common electrode layer. Preferably, a shape of the auxiliary electrode within the sub-pixel is consistent with a shape of the touch electrode within the sub-pixel.

It can be seen that, in the array substrate described above, with the auxiliary electrode layer, the coupling capacitance between the touch display electrode blocks and the wirings can be reduced, thereby improving accuracy of the touch detection.

Figure 5A:
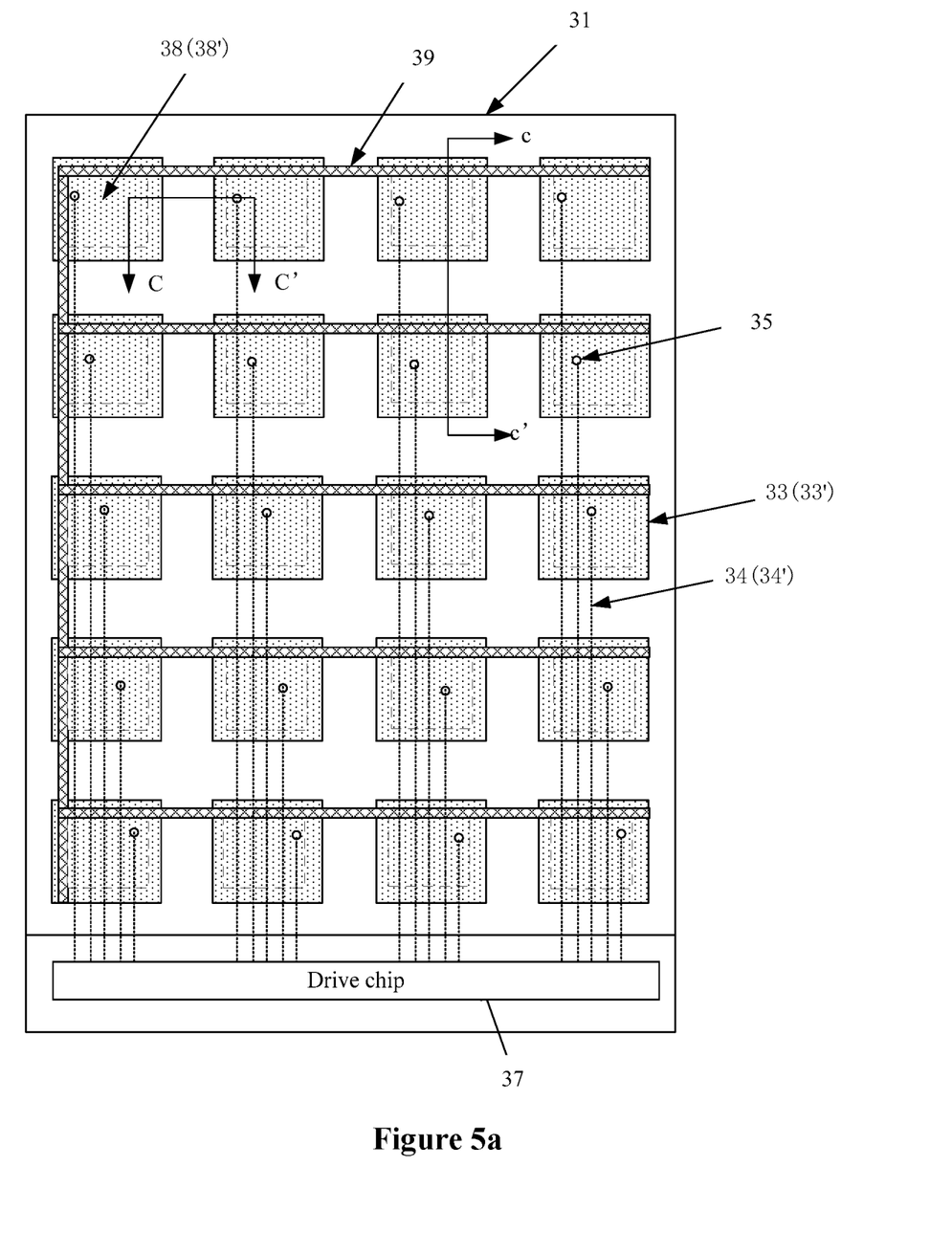
FIG. 5a is a plan view of another array substrate according to an embodiment of the present disclosure.
Figure 5B:
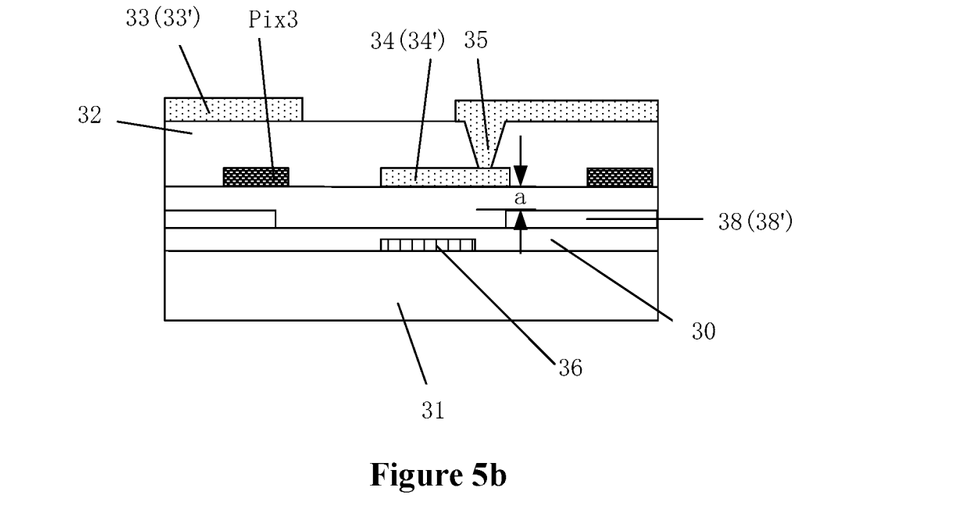
FIG. 5b is a sectional view of the array substrate as shown in FIG. 5a in the CC' direction.
Figure 5C:
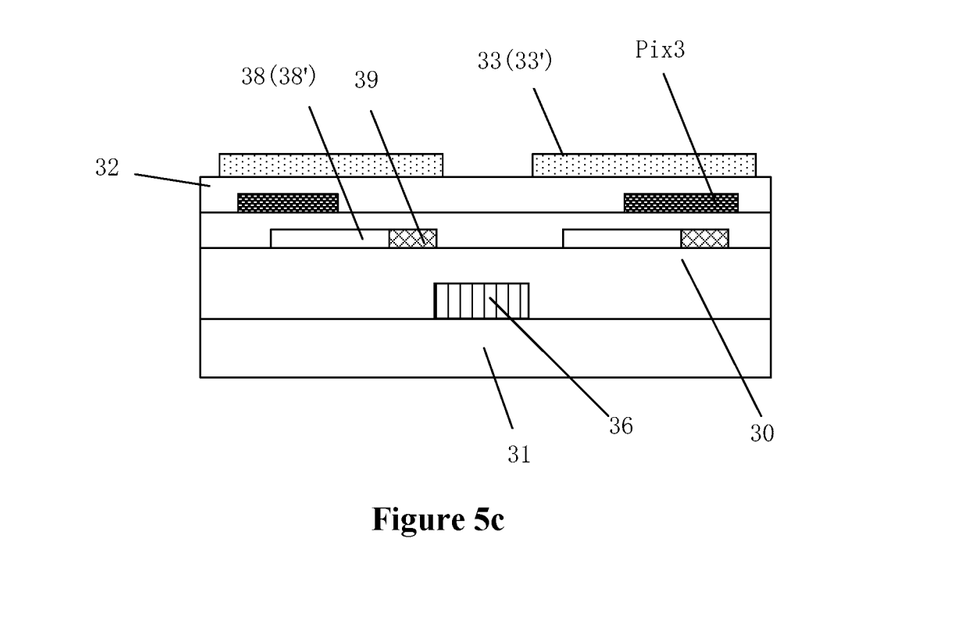
FIG. 5c is a sectional view of the array substrate as shown in FIG. 5a in the cc' direction.

Based on the above embodiments, an array substrate is further provided in another embodiment of the present disclosure. A structure of the array substrate is as shown in FIGS. 5a, 5b and 5c. The array substrate includes: a substrate 31; a common electrode layer 33' and a wiring layer 34' arranged on a same side of the substrate 31; and an auxiliary electrode layer 58 located between the wiring layer 34' and the substrate. The common electrode layer 33' and the wiring layer 34' are arranged opposite to each other. The common electrode layer 33' includes multiple touch display electrode blocks 33 arranged in an array. The wiring layer 34' includes multiple wirings 34 electrically connected to the multiple touch display electrode blocks 33 in a one-to-one correspondence. The auxiliary electrode layer 58 is located on a side of the wiring layer 34' facing away from the common electrode layer 33'. The auxiliary electrode layer 58 is insulated from the common electrode layer 33' and the wiring layer 34'. The auxiliary electrode layer 58 is provided with a touch driving signal during a touch timing period and is provided with a common voltage signal during a display timing period.

Each of the wirings 34 is electrically connected to a drive chip 37. The common electrode layer 33' and the wiring layer 34' are arranged in different conductive layers. An insulating layer 32 is provided between the wiring layer 34' and the common electrode layer 33'. The touch display electrode block 33 is electrically connected to a respective wiring 34 through a via hole 35. An insulating layer 30 is provided between the substrate 31 and the wiring layer 34'. The array substrate further includes a data line 36 arranged on a surface of the substrate 31. A surface of the data line 36 is covered by the insulating layer 30.

With the auxiliary electrode layer, electric-field distribution between the common electrode layer and the wiring layer can be changed, thereby reducing coupling capacitance between the common electrode layer and the wiring layer, increasing strength of the touch signal, and thus improving accuracy of the touch detection.

In the embodiments as shown in FIGS. 5a, 5b and 5c, the auxiliary electrode layer 38' includes multiple auxiliary electrode blocks 38 electrically connected to each other via connectors 39. The auxiliary electrode blocks 38 are arranged in a same conductive layer as the connectors 39. In this case, the auxiliary electrode blocks 38 is composed of a same metal layer as the connectors 39, and the auxiliary electrode blocks 38 and the connectors 39 are formed as a whole. A boundary line between the auxiliary electrode block 28 and the connector 29 as shown in Figured 5a and 5c is merely for facilitating the distinction and explanation, but does not exist in a real product. In an alternative embodiment, the connectors may be arranged in a different layer from the auxiliary electrode layer 38' and located on a side of the substrate 31 closer to the auxiliary electrode block 38, and the auxiliary electrode block may be electrically connected to the connector through a via hole.

The array substrate further includes multiple pixel transistors arranged in an array and pixel electrodes Pix3 electrically connected to the multiple pixel transistors in a one-to-one correspondence. Each of the pixel transistors has a gate, a first electrode and a second electrode, with the second electrode being electrically connected to a respective one of the pixel electrodes Pix3. It should be noted that, no pixel transistor is shown in FIGS. 5a, 5b and 5c due to the perspective.

As shown in FIG. 5a, a projection of the auxiliary electrode block 38 on a surface of the substrate 31 is located within a projection of the touch display electrode block 33 on the surface of the substrate 31 in the direction perpendicular to the substrate 31, and the auxiliary electrode blocks 38 and the touch display electrode blocks 33 have a oneto-one correspondence in the direction perpendicular to the substrate 31. The shapes of the auxiliary electrode block 38 and the touch display electrode block 33 are rectangles with a same length-width ratio, and centers of the auxiliary electrode block 38 and the touch display electrode block 33 are arranged directly facing toward each other in the direction perpendicular to the substrate 31. The auxiliary electrode block 38 may have a size which is the same as or less than that of the touch display electrode block 33.

To achieve normal image display, the auxiliary electrode blocks 38 and the connectors 39 each are transparent. Preferably, the auxiliary electrode blocks 38 and the connectors 39 may be composed of indium tin oxide (ITO).

In an alternative embodiment, a projection of the auxiliary electrode block on a surface of the substrate is located within a projection of the pixel electrode on a surface of the substrate 31 in the direction perpendicular to the substrate, and the auxiliary electrode blocks and the pixel electrodes have a one-to-one correspondence in the direction perpendicular to the substrate. In this case, the auxiliary electrode blocks and the pixel electrodes are arranged opposite to each other, and the auxiliary electrode blocks are transparent, so that normal image display is achieved. The connectors may be transparent or non-transparent.

In touch detection, to reduce interference of the wirings on the touch display electrode blocks effectively, a distance a between the wiring layer and the auxiliary electrode blocks is set to be equal to or less than 10 μm. In this case, with the auxiliary electrode blocks, coupling capacitance between the wiring and the touch display electrode block is reduced effectively, thereby improving accuracy of the touch detection.

Figure 6A:
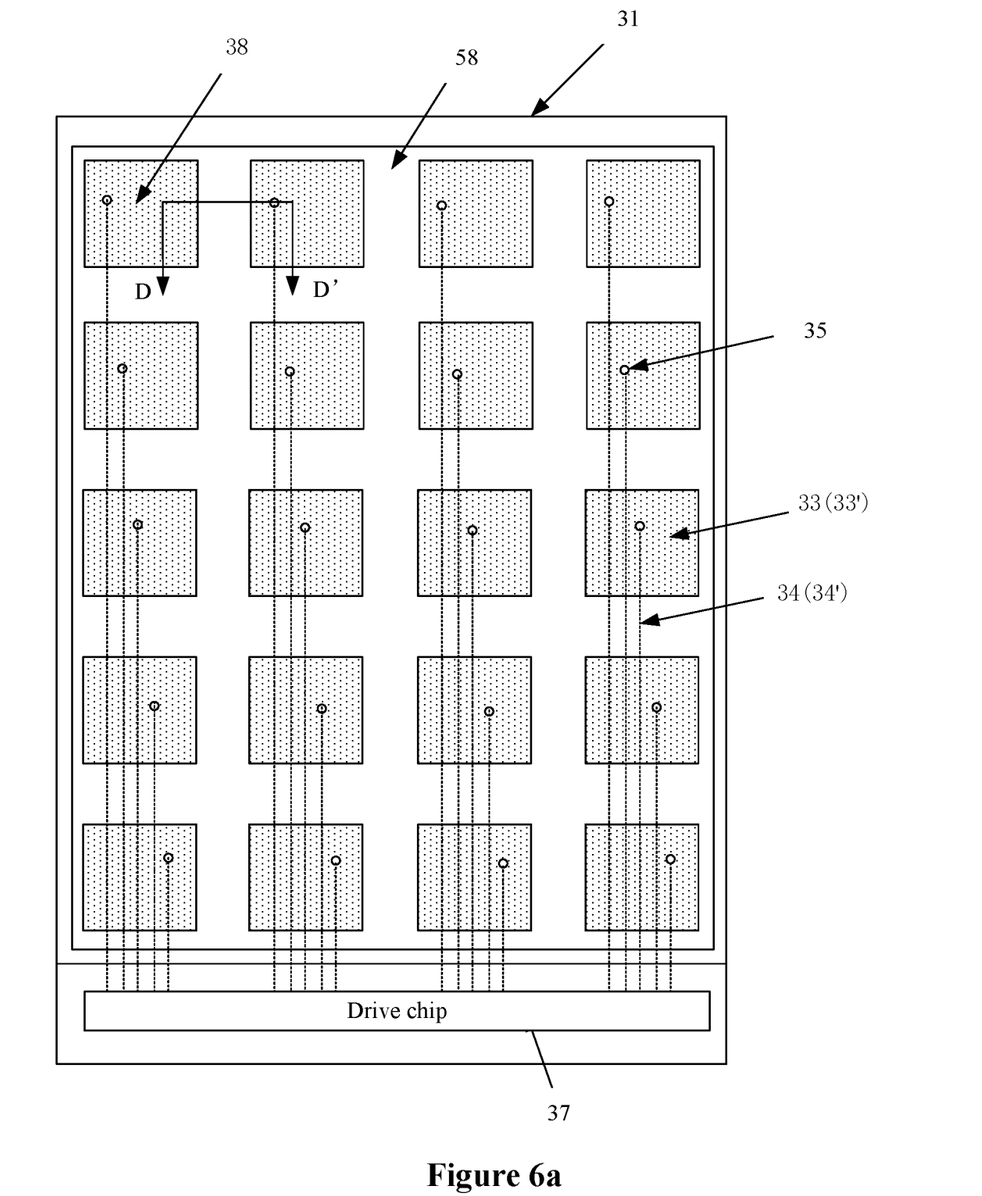
FIG. 6a is a plan view of still another array substrate according to an embodiment of the present disclosure.
Figure 6B:
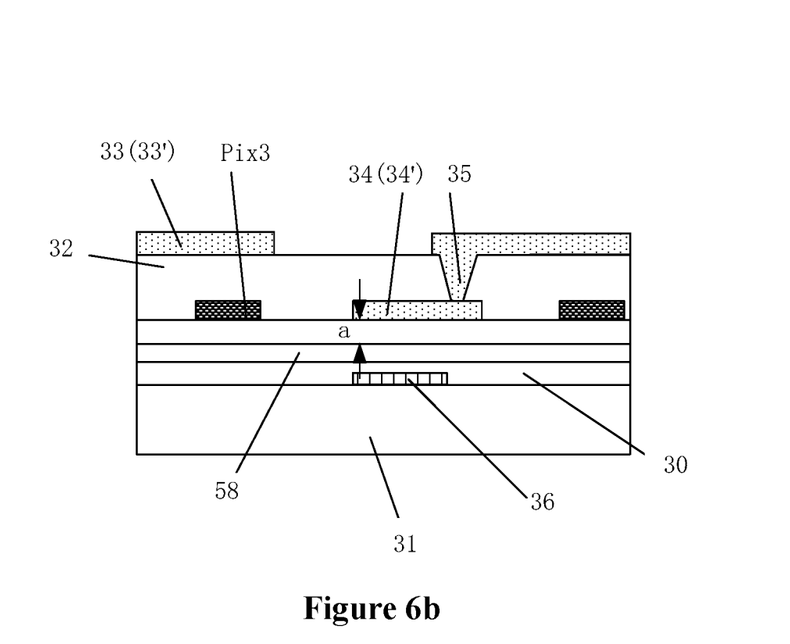
FIG. 6b is a sectional view of the array substrate as shown in FIG. 6a in the DD' direction.

In the embodiments as shown in FIGS. 5a, 5b and 5c, the wiring layer is located between the common electrode layer and the substrate. The auxiliary electrode layer is located between the wiring layer and the substrate. The auxiliary electrode layer may be a planar electrode layer, in a case that the wiring layer is located between the common electrode layer and the substrate and the auxiliary electrode layer is located between the wiring layer and the substrate. In this case, the array substrate may have a structure as shown in FIGS. 6a, 6b and 6c. FIGS. 6a, 6b and 6c differ from FIGS. 5a, 5b and 5c in that, the auxiliary electrode layer 58 is a planar electrode layer which is a transparent conductive layer.

The wiring layer may be arranged in a same layer as the pixel electrode. Alternatively, the wiring layer and the pixel electrode may be located in different conductive layers. Preferably, the wiring layer is arranged in a same layer as the pixel electrodes, to decreasing a thickness of the panel.

Similarly to the above embodiments, in the array substrate according to this embodiment, with the auxiliary electrode layer, electric-field distribution between the wiring layer and the common electrode layer can be changed, thereby reducing coupling capacitance between the touch display electrode blocks and the wirings, and thus increasing the accuracy of the touch detection.

In the technical solutions according to the present disclosure, with the auxiliary electrode layer additionally provided in the array substrate, the coupling capacitance between the wiring and the touch electrode block is reduced, thereby increasing strength of the touch signal and sensitivity of the touch.

Figure 7:
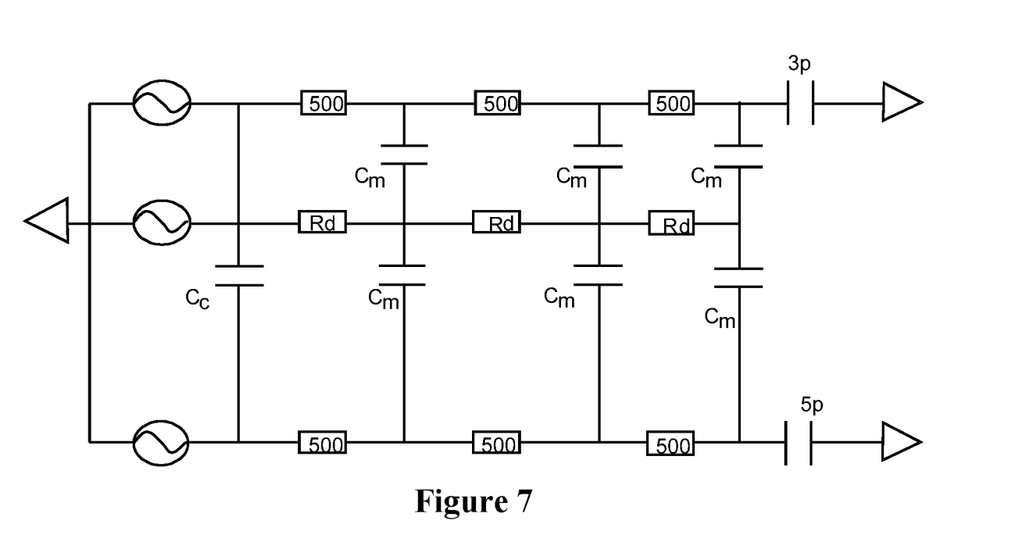
FIG. 7 is an equivalent circuit diagram of an array substrate according to an embodiment of the present disclosure.

Referring to FIG. 7, FIG. 7 is an equivalent circuit diagram of an array substrate according to an embodiment of the present disclosure. In FIG. 7, a capacitor 3p indicates a coupling capacitance between a touch display electrode block and an adjacent touch display electrode, and a capacitor 5p indicates a coupling capacitance between a touch display electrode block the ground. A resistor 500 indicates an equivalent resistance of a touch display electrode block and a respective wiring thereof. A capacitor Cm indicates a coupling capacitance between the additionally provided auxiliary electrode block and a touch display electrode and a respective wiring thereof. A capacitor Cc indicates a coupling capacitance between a touch display electrode in a column direction and a wiring thereof in a one-to-one correspondence, and all the touch display electrodes in an extending direction of the touch display electrode and respective wirings thereof.

The capacitor Cm and the capacitor Cc each have an effect on a touch signal. The effect of the capacitor Cc on the touch signal is a greater effect than that of the capacitor Cm on the touch signal. Touch detection signals of the touch display electrode blocks may have crosstalk via the capacitor Cc directly. The auxiliary electrode layer additionally provided in the technical solution of the present disclosure may increase the capacitance of Cm and decrease the capacitance of Cc. On the whole, a problem of signal crosstalk is alleviated, the coupling capacitance between the wiring and the touch display electrode block is reduced, strength of the touch detection signal is enhanced, and accuracy of the touch detection is increased.

In a case of meeting a load such as a resistor, the auxiliary electrode layer may be titled on a whole surface; or the auxiliary electrode layer may include multiple auxiliary electrode blocks, with a shape of the auxiliary electrode block being the same as the pixel electrode or the touch display electrode block, and the auxiliary electrode blocks being interconnected with the pixel electrodes or the touch display electrode blocks. The auxiliary electrode layer is provided with the touch signal during a touch driving stage, and is provided with a common electrode signal during display stage. The auxiliary electrode layer may be directly provided with the signal via the drive chip, or be provided with the signal after conversion by other signal lines.

A positional relationship between the auxiliary electrode layer and the common electrode layer, the wiring layer and the data line in the direction perpendicular to the substrate may be set as required, which is not specifically limited. To avoid the effect on the data signal in the data line, the auxiliary electrode layer may be arranged between the data line and the substrate, and the array substrate in this case has a structure as shown in FIG. 8.

Figure 8:
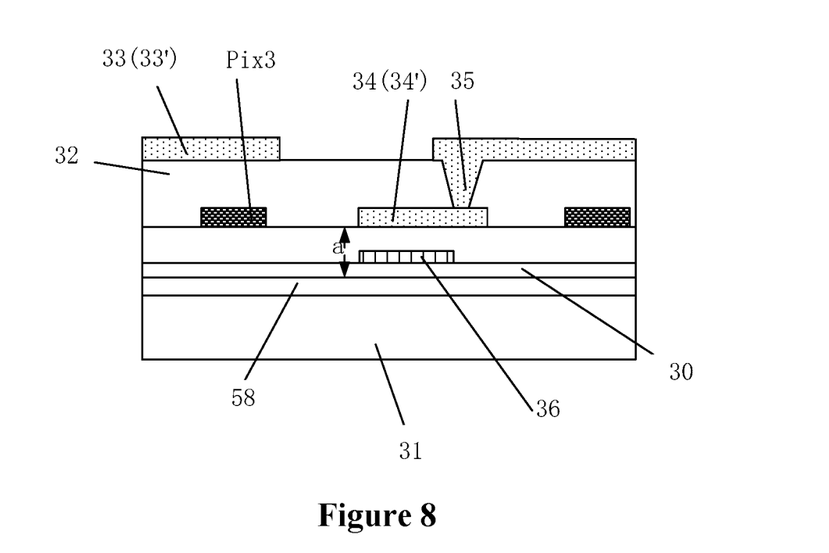
FIG. 8 is a schematic structural diagram of yet another array substrate according to an embodiment of the present disclosure.

Referring to FIG. 8, FIG. 8 is a schematic structural diagram of yet another array substrate according to an embodiment of the present disclosure. This embodiment differs from the embodiment as shown in FIG. 6b in that, the auxiliary electrode layer 58 is located between the data line 36 and the substrate 31. As described above, the auxiliary electrode layer is preferably arranged below the data line 36, to prevent the data signal from being affected the auxiliary electrode layer 58.

In the above embodiments, a relative positional relationship between the touch electrode and the pixel electrode is not limited, which may be a Top-com structure in which the touch electrode (the common electrode) is located above the pixel electrode, or a Middle-com structure in which the touch electrode (the common electrode) is located below the pixel electrode.

Next, in conjunction with specific experimental data, a function of the auxiliary electrode layer in the array substrate in the embodiment of the present disclosure for reducing the coupling capacitance between the wiring and the touch display electrode block is illustrated, as shown in Table 1 as follows:

TABLE 1

| Number of experimental example | First experimental example | Second experimental example | Third experimental example |
|---|---|---|---|
| set status of the auxiliary electrode layer | without auxiliary electrode layer | The auxiliary electrode layer is arranged between the common electrode layer and the wiring layer | The auxiliary electrode layer is located below the wiring layer |
| Coupling capacitance between the touch display electrode blocks and the wirings | 89.6 pF/m | 69.6 pF/m | 10.3 pF/m |

In the second experimental example and the third experimental example, the auxiliary electrode layer is provided with the touch detection signal during a touch detection timing period. It can be seen from the data in the above table that, the auxiliary electrode layer is formed and is provided with the touch detection signal during the touch timing period, the coupling capacitance between the touch display electrode blocks and the wirings can be reduced effectively, thus strength of the touch detection signal is enhanced and accuracy of the touch detection is improved.

Figure 9:
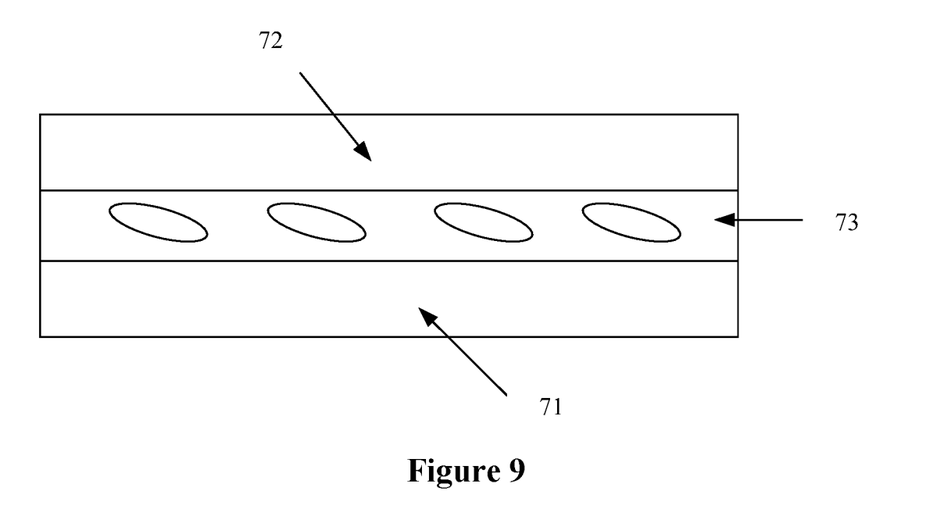
FIG. 9 is a schematic structural diagram of a touch display panel according to an embodiment of the present disclosure.

Based on the above embodiments of the array substrate, a touch display panel is further provided in another embodiment of the present disclosure. As shown in FIG. 9, the touch display panel includes:

an array substrate 71 and a color film substrate 72 arranged opposite to each other, where the array substrate 71 is the one according to any one of the above embodiments; and a liquid crystal layer 73 arranged between the array substrate and the color film substrate.

The touch display panel includes the array substrate according to the above embodiment, and thus the touch detection has a higher accuracy.

According to the above descriptions of the disclosed embodiments, those skilled in the art can implement or practice the present disclosure. Various modifications made to these embodiments are apparent to those skilled in the art, and general principles defined herein may be applied in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. An array substrate, comprising:
a substrate;
a plurality of touch display electrode blocks arranged in a common electrode layer and a plurality of wirings arranged in a wiring layer, wherein the common electrode layer and the wiring layer are arranged on a same side of the substrate, an insulating layer is provided between the common electrode layer and the wiring layer, the plurality of touch display electrode blocks are arranged in an array, the plurality of wirings are electrically connected to the plurality of touch display electrode blocks in a one-to-one correspondence, wherein each of the plurality of wirings are connected to a drive chip, each of the plurality of touch display electrode blocks are electrically connected to a respective wiring through a via hole and are provided with a touch driving signal via the respective wiring during a touch timing period for touch driving and are provided with a common voltage signal via the respective wiring during a display timing period for display driving; and a plurality of auxiliary electrode blocks arranged in an auxiliary electrode layer, the auxiliary electrode layer located between the wiring layer and the substrate, wherein the auxiliary electrode layer is located on a side of the wiring layer facing away from the common electrode layer, and the auxiliary electrode layer is insulated from the common electrode layer and the wiring layer, wherein each of the plurality of auxiliary electrode blocks are connected to the drive chip and are provided with the touch driving signal during the touch timing period and are provided with the common voltage signal during the display timing period for display driving.

2. The array substrate according to claim 1, wherein
the auxiliary electrode layer comprises the plurality of auxiliary electrode blocks electrically connected to each other via connectors; and
the connectors are located on a side of the substrate closer to the auxiliary electrode blocks, and the plurality of auxiliary electrode blocks are electrically connected to the connectors through a via hole; or the plurality of auxiliary electrode blocks are arranged in the same conductive layer as the connectors.

3. The array substrate according to claim 2, further comprising a plurality of pixel transistors arranged in an array and pixel electrodes electrically connected to the plurality of pixel transistors in a one-to-one correspondence, wherein each of the plurality of pixel transistors has a gate, a first electrode, and a second electrode, with the second electrode being electrically connected to a respective one of the pixel electrodes.

4. The array substrate according to claim 3, wherein
the plurality of auxiliary electrode blocks have a shape matching with that of the pixel electrode; and
the plurality of auxiliary electrode blocks and the pixel electrodes have a one-to-one correspondence in a direction perpendicular to the substrate.

5. The array substrate according to claim 4, wherein
the plurality of auxiliary electrode blocks are transparent; and
the connectors are transparent or non-transparent.

6. The array substrate according to claim 2, wherein
the plurality of auxiliary electrode blocks have a shape matching with that of the plurality of touch display electrode blocks; and
the plurality of auxiliary electrode blocks and the plurality of touch display electrode blocks have a one-to-one correspondence in a direction perpendicular to the substrate.

7. The array substrate according to claim 6, wherein the plurality of auxiliary electrode blocks and the connectors each are transparent.

8. The array substrate according to claim 1, wherein a distance between the wiring layer and the plurality of auxiliary electrode blocks are equal to or less than 10 μm.

9. A touch display panel, comprising:
an array substrate and a color film substrate arrange opposite to each other; and a liquid crystal layer arranged between the array substrate and the color film substrate,
wherein the array substrate comprises:
a substrate;
a plurality of touch display electrode blocks arranged in a common electrode layer and a plurality of wirings arranged in a wiring layer, wherein the common electrode layer and the wiring layer are arranged on a same side of the substrate, an insulating layer is provided between the common electrode layer and the wiring layer, the plurality of touch display electrode blocks are arranged in an array, the plurality of wirings are electrically connected to the plurality of touch display electrode blocks in a one-to-one correspondence, wherein each of the plurality of wirings are connected to a drive chip, each of the plurality of touch display electrode blocks are electrically connected to a respective wiring through a via hole and are provided with a touch driving signal via the respective wiring during a touch timing period for touch driving and are provided with a common voltage signal via the respective wiring during a display timing period for display driving; and
a plurality of auxiliary electrode blocks arranged in an auxiliary electrode layer, the auxiliary electrode layer located between the wiring layer and the substrate, wherein the auxiliary electrode layer is located on a side of the wiring layer facing away from the common electrode layer, and the auxiliary electrode layer is insulated from the common electrode layer and the wiring layer, wherein each of the plurality of auxiliary electrode blocks are connected to the drive chip and are provided with the touch driving signal during the touch timing period and are provided with the common voltage signal during the display timing period for display driving.

* * * * *